(12) United States Patent
Nakayama

(10) Patent No.: US 12,429,975 B2
(45) Date of Patent: Sep. 30, 2025

(54) TOUCH PANEL

(71) Applicant: FUJIFILM Corporation, Tokyo (JP)

(72) Inventor: Masaya Nakayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/671,571

(22) Filed: May 22, 2024

(65) Prior Publication Data

US 2024/0402846 A1 Dec. 5, 2024

(30) Foreign Application Priority Data

Jun. 5, 2023 (JP) ................................. 2023-092437

(51) Int. Cl.
| | |
|---|---|
| *G06F 3/041* | (2006.01) |
| *G06F 3/044* | (2006.01) |
| *G06F 3/047* | (2006.01) |

(52) U.S. Cl.
CPC ........ *G06F 3/04164* (2019.05); *G06F 3/0445* (2019.05); *G06F 3/047* (2013.01)

(58) Field of Classification Search
CPC ..... G06F 3/04164; G06F 3/0445; G06F 3/047
USPC ....................................................... 345/173
See application file for complete search history.

(56) References Cited

U.S. PATENT DOCUMENTS

| | | | | |
|---|---|---|---|---|
| 2012/0313881 A1* | 12/2012 | Ge | ......................... | G02F 1/1362 |
| | | | | 345/174 |
| 2014/0210784 A1* | 7/2014 | Gourevitch | ........... | G06F 3/0443 |
| | | | | 345/174 |
| 2018/0307353 A1* | 10/2018 | Lee | ........................ | G06F 3/0445 |
| 2021/0223877 A1* | 7/2021 | Wang | .................... | G06F 3/0445 |

FOREIGN PATENT DOCUMENTS

| | | |
|---|---|---|
| CN | 218100186 U | 12/2022 |
| CN | 218100187 U | 12/2022 |
| CN | 218100201 U * | 12/2022 |
| CN | 218273360 U | 1/2023 |
| CN | 218768105 U | 3/2023 |
| JP | 2021-157421 A | 10/2021 |

\* cited by examiner

*Primary Examiner* — Mark Edwards
(74) *Attorney, Agent, or Firm* — Edwards Neils LLC; Jean C. Edwards, Esq.

(57) ABSTRACT

A touch panel that makes it possible to narrow a peripheral region not used for touch detection. The touch panel includes a first conductive layer consisting of a first fine metal wire, an insulating layer, and a second conductive layer consisting of a second fine metal wire that are sequentially laminated, where the first conductive layer has first detection electrodes, first dummy electrodes, and second wiring lines that are disposed on the first dummy electrode, the second conductive layer has second detection electrodes, connecting portions that penetrate the insulating layer and connect the second detection electrodes and the second wiring lines to each other are provided, a mesh pattern is composed of the first fine metal wire and the second fine metal wire, and the second wiring lines and the second detection electrodes corresponding to each other are connected to each other by two or more of the connecting portions.

20 Claims, 7 Drawing Sheets

TOUCH PANEL

CROSS-REFERENCE TO RELATED APPLICATIONS

The present application claims priority under 35 U.S.C. § 119 to Japanese Patent Application No. 2023-092437, filed on Jun. 5, 2023. The above application is hereby expressly incorporated by reference, in its entirety, into the present application.

BACKGROUND OF THE INVENTION

1. Field of the Invention

The present invention relates to a touch panel that detects a touch operation.

2. Description of the Related Art

In the related art, in various electronic apparatuses including portable information apparatuses such as a tablet-type computer and a smartphone, a touch panel that detects a so-called touch operation by which a finger, a stylus pen, or the like is brought into contact with or is made to approach a screen has been used.

In such a touch panel, there are many cases in which for example, as disclosed in JP2021-157421A, a plurality of first detection electrodes that extend along a first direction and are arranged in a second direction orthogonal to the first direction, and a plurality of second detection electrodes that extend along the second direction and are arranged in the first direction are disposed on an insulating layer to overlap with each other, a plurality of first wiring lines are led out from an end portion of the plurality of first detection electrodes in the first direction, and a plurality of second wiring lines are led out from an end portion of the plurality of second detection electrodes in the second direction.

SUMMARY OF THE INVENTION

By the way, regarding the touch panel, there is an increasing demand for so-called frame narrowing in which a peripheral region that is located outside the touch region and is not used for touch detection is narrowed. As in the touch panel disclosed in JP2021-157421A, in a case of leading out a plurality of first wiring lines and a plurality of second wiring lines from an end portion of a plurality of first detection electrodes in a first direction and an end portion of a plurality of second detection electrodes in a second direction, it is necessary to ensure, on an insulating layer, a region for disposing the plurality of first wiring lines and the plurality of second wiring lines, which are led out in both the first direction and the second direction, and thus, there is a case where it is difficult to carry out frame narrowing at a certain level or higher level.

The present invention has been made in order to solve the above-described problems, and an object of the present disclosure is to provide a touch panel that makes it possible to narrow a peripheral region which is not used for touch detection.

According to the following configurations, the above-described object can be achieved.

[1] A touch panel comprising:
a touch region; and
a peripheral region that is present outside the touch region,
wherein the touch panel has a configuration in which a first conductive layer consisting of a first fine metal wire, an insulating layer, and a second conductive layer consisting of a second fine metal wire are sequentially laminated,
the first conductive layer has a plurality of first detection electrodes that are formed in the touch region, extend along a first direction, and are arranged in a second direction orthogonal to the first direction, a plurality of first dummy electrodes that are disposed between the plurality of first detection electrodes and insulated from the plurality of first detection electrodes, a plurality of first wiring lines that are formed in the peripheral region and connected to the plurality of first detection electrodes, and a plurality of second wiring lines that are disposed on the plurality of first dummy electrodes,
the second conductive layer has a plurality of second detection electrodes that are formed in the touch region, extend along the second direction, and are arranged in the first direction,
a plurality of connecting portions, which penetrate the insulating layer and connect the plurality of second detection electrodes and the plurality of second wiring lines to each other, are provided,
in planar view,
the plurality of first detection electrodes have a first mesh pattern formed from the first fine metal wire,
the plurality of second detection electrodes has a second mesh pattern formed from the second fine metal wire,
in the touch region, the first mesh pattern and the second mesh pattern are combined with each other in planar view to constitute a third mesh pattern,
the plurality of second wiring lines correspond to the plurality of second detection electrodes, and
the second wiring line and the second detection electrode corresponding to each other are connected to each other by two or more of the connecting portions.
[2] The touch panel according to [1],
in which the plurality of second wiring lines and the corresponding plurality of second detection electrodes are respectively connected to each other by three or more of the connecting portions.
[3] The touch panel according to [1] or [2],
in which the connecting portion is disposed at an intersection of the second mesh pattern.
[4] The touch panel according to [1] or [2],
in which the first dummy electrode has the first mesh pattern in planar view, and
the connecting portion is disposed at an intersection portion between the first mesh pattern and the second mesh pattern in planar view.
[5] The touch panel according to any one of [1] to [4],
in which the connecting portion is composed of a conductive material different from a conductive material that constitutes the second detection electrode and the second wiring line.
[6] The touch panel according to [5],
in which the conductive material of the connecting portion is a transparent conductive material.
[7] The touch panel according to any one of [1] to [6],
in which the first dummy electrode has the first mesh pattern in planar view, and
the second wiring lines constitute a part of the first mesh pattern in planar view.
[8] The touch panel according to any one of [1] to [7],
in which the first dummy electrode has a first ground wiring line that is disposed between the first detection electrode and the second wiring line and is insulated from the first detection electrode and the second wiring line, and the first ground wiring line constitutes a part of the first mesh pattern.

[9] The touch panel according to any one of [1] to [8], in which the first fine metal wire has at least two or more disconnected portions that are adjacent to each other in a direction in which the first fine metal wire extends, between the second wiring line and the first detection electrode adjacent to the second wiring line.

[10] The touch panel according to [8], in which the first fine metal wire has at least two or more disconnected portions, each of which is adjacent in a direction in which the first fine metal wire extends, between the first ground wiring line and the first detection electrode adjacent to the first ground wiring line and between the first ground wiring line and the second wiring line adjacent to the first ground wiring line.

[11] The touch panel according to any one of [1] to [10], in which a thickness of the insulating layer is 0.5 µm or more and 5.0 µm or less.

According to the present invention, the touch panel has a configuration in which a first conductive layer consisting of a first fine metal wire, an insulating layer, and a second conductive layer consisting of a second fine metal wire are sequentially laminated, where the first conductive layer has a plurality of first detection electrodes that are formed in the touch region, extend along a first direction, and are arranged in a second direction orthogonal to the first direction, a plurality of first dummy electrodes that are disposed between the plurality of first detection electrodes and insulated from the plurality of first detection electrodes, a plurality of first wiring lines that are formed in the peripheral region and connected to the plurality of first detection electrodes, and a plurality of second wiring lines that are disposed on the plurality of first dummy electrodes, the second conductive layer has a plurality of second detection electrodes that are formed in the touch region, extend along the second direction, and are arranged in the first direction, a plurality of connecting portions, which penetrate the insulating layer and connect the plurality of second detection electrodes and the plurality of second wiring lines to each other, are provided, in planar view, the plurality of first detection electrodes have a first mesh pattern formed from the first fine metal wire, the plurality of second detection electrodes has a second mesh pattern formed from the second fine metal wire, in the touch region, the first mesh pattern and the second mesh pattern are combined with each other in planar view to constitute a third mesh pattern, the plurality of second wiring lines correspond to the plurality of second detection electrodes, and the second wiring lines and the plurality of second detection electrodes corresponding to each other are connected to each other by two or more of the connecting portions. Therefore, it is possible to provide a touch panel that makes it possible to narrow a peripheral region which is not used for touch detection and has good yield and high sensitivity as well.

DESCRIPTION OF THE PREFERRED EMBODIMENTS

Hereinafter, a conductive member for a touch panel and a touch panel according to embodiments of the present invention will be described in detail, based on suitable embodiments shown in the attached drawings.

It is noted that in the following description, a notation of "to" which is used to indicate a range of numerical values is intended to include numerical values described on both sides. For example, the phrase "s is a numerical value t1 to a numerical value t2" means that the range of s is a range including the numerical value t1 and the numerical value t2, and means $t1 \leq s \leq t2$ as expressed in mathematical symbols.

Unless otherwise specified, an angle including "orthogonal", "parallel", or the like is intended to include an error range generally allowed in the related technical field.

The term "transparent" indicates that a light transmittance in a visible light wavelength range of 400 to 800 nm is at least 40% or more, preferably 75% or more, more preferably 80% or more, and still more preferably 90% or more. The light transmittance is measured by using "Plastics-Determination of total light transmittance and total light reflectivity" specified in JIS K 7375:2008.

Embodiment 1

Figure 1:
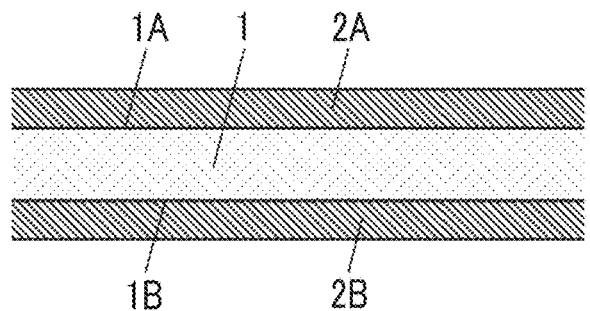
FIG. 1 is a partial cross-sectional view showing a touch panel according to an embodiment 1.

FIG. 1 shows a configuration of a touch panel according to an embodiment 1 of the present invention.

The touch panel includes an insulating layer 1 that has a first surface 1A and a second surface 1B, which form together the front and the back, a first conductive layer 2A that is disposed on the first surface 1A of the insulating layer 1, and a second conductive layer 2B that is disposed on the second surface 1B of the insulating layer 1. The insulating layer 1 is composed of a transparent material.

The touch panel has a cover member disposed on a surface on the first conductive layer 2A side, the cover member not being shown in the drawing, and has a display module bonded to a surface on the second conductive layer 2B side, the display module not being shown in the drawing. As a result, it can be used as a touch panel display device that is not shown in the drawing. In this case, a finger, a stylus pen, or the like of a user, which has come into contact with or approached the cover member, is detected, and a touch operation by the user is detected.

Figure 2:
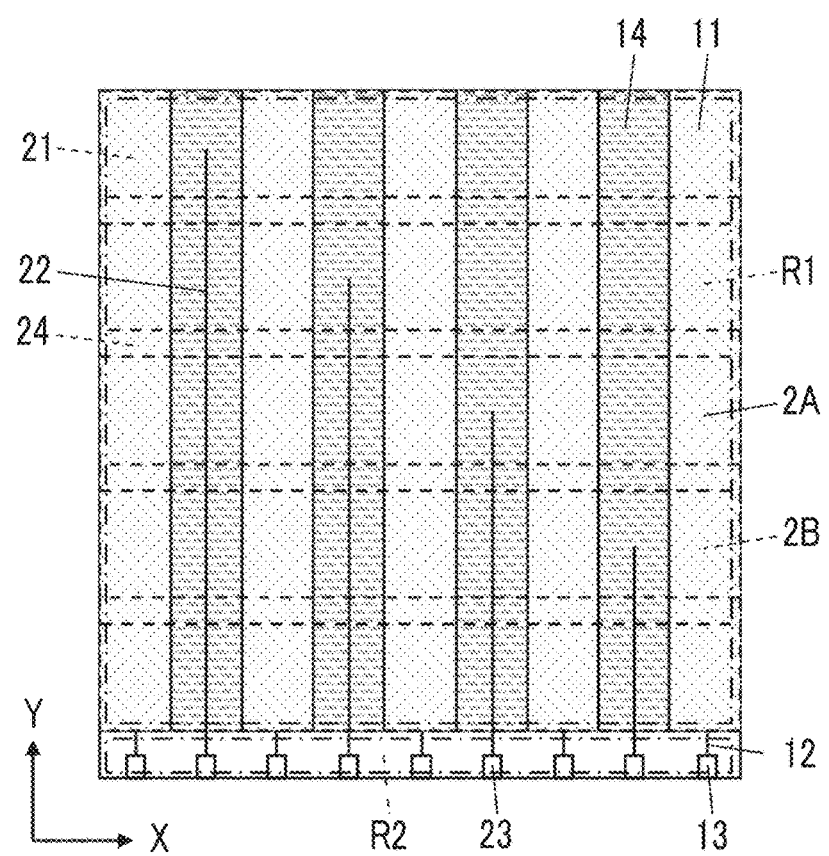
FIG. 2 is a plan view showing the touch panel according to the embodiment 1.

FIG. 2 is a plan view showing the touch panel. The first conductive layer 2A has a plurality of first detection electrodes 11 for detecting the touch operation, which extend along a determined Y direction (first direction) and are arranged in an X direction (second direction) orthogonal to the Y direction and which are disposed in a touch region R1; a first wiring line 12 that is disposed in a peripheral region R2 present outside the touch region R1 and is led out from one end of the plurality of first detection electrodes 11 in the Y direction; and a plurality of first electrode pads 13 that are connected to a plurality of first wiring lines 12. The plurality of first electrode pads 13 are used for electrical connection to a touch panel drive device not shown in the drawing.

In addition, the first conductive layer 2A has a plurality of first dummy electrodes 14, which are disposed between the plurality of first detection electrodes 11, which extend in the Y direction and are arranged in the X direction, and which are disposed in the touch region R1. The plurality of first dummy electrodes 14 are electrically insulated from the plurality of first detection electrodes 11.

In addition, the first conductive layer 2A has a plurality of second wiring lines 22 that are each disposed in the plurality of first dummy electrodes 14, and a plurality of second electrode pads 23 that are disposed in the peripheral region R2 present outside the touch region R1 and are connected to the plurality of second wiring lines 22. As will be described later, the plurality of second wiring lines 22 are connected to second detection electrodes 21 of the second conductive layer 2B through opening portions, that is, so-called through holes, which are formed in the insulating layer 1. Similar to the plurality of first electrode pads 13, the plurality of second electrode pads 23 are used for electrical connection to a touch panel drive device not shown in the drawing.

The second conductive layer 2B includes a plurality of second detection electrodes 21 for detecting the touch operation, which extend along the X direction and are arranged along the Y direction and which are disposed in the touch region R1. In addition, it can have a plurality of second dummy electrodes 24, which are disposed between the plurality of second detection electrodes 21 and which extend in the X direction and are arranged in the Y direction. The plurality of second dummy electrodes 24 are electrically insulated from the plurality of second detection electrodes 21.

The touch panel has the touch region R1 for detecting a touch operation of a user, in which the plurality of first detection electrodes 11 and the plurality of second detection electrodes 21 are disposed to overlap with each other; and the peripheral region R2 which is present outside the touch region R1. The peripheral region R2 is a region that extends to one end side of the touch region R1 in the Y direction, and a part of the plurality of first wiring lines 12, the plurality of first electrode pads 13, and the plurality of second wiring lines 22, and the plurality of second electrode pads 23 are disposed in the peripheral region R2.

Figure 3:
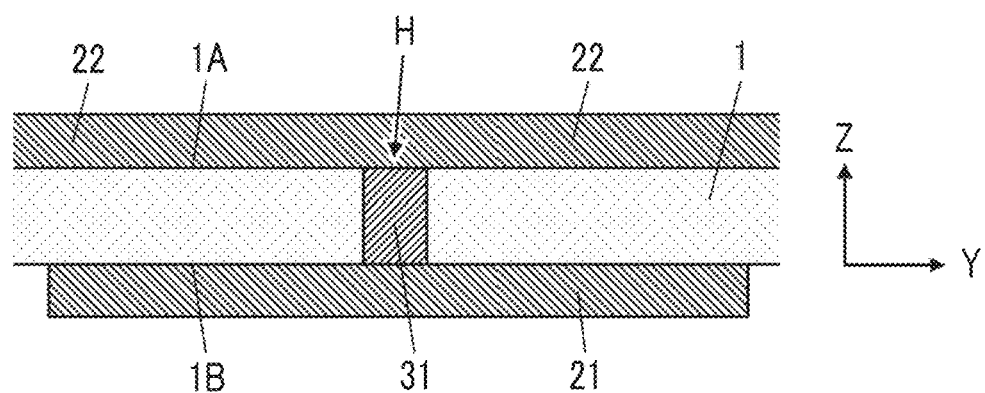
FIG. 3 is a partial cross-sectional view showing an enlarged opening portion formed in an insulating layer according to the embodiment 1.

As shown in FIG. 3, the insulating layer 1 has a plurality of opening portions H and a plurality of connecting portions 31 that are formed in the plurality of opening portions H to penetrate the insulating layer 1 and electrically connect the plurality of second detection electrodes 21 and a plurality of second wiring lines 22 to each other. A form of the connecting portion 31 is not particularly limited; however, for example, the connecting portion 31 can be composed of a conductor with which the opening portion H is filled as shown in FIG. 3. In addition, the connecting portion 31 can also be composed of a conductive layer that is formed on the inner wall of the opening portion H.

By the way, in general, there are many cases in which, in the touch panel, the plurality of first wiring lines 12 and the plurality of second wiring lines 22 are led out from each of one end of the plurality of first detection electrodes 11 in the Y direction and one end of the plurality of second detection electrodes 21 in the X direction. In recent years, there has been an increasing demand for so-called frame narrowing, in which the peripheral region R2 that is not used for touch detection is narrowed. However, in this case, at least both of one end side of the touch region R1 in the Y direction and one end side of the touch region R1 in the X direction, it is necessary to ensure a region on the insulating layer 1, in which the plurality of first wiring lines 12 and the plurality of second wiring lines 22 are disposed, and thus there is a case where it is difficult to carry out frame narrowing at a certain level or higher level.

In the touch panel according to the embodiment 1, the second detection electrode 21 is connected to the second wiring line 22 disposed in the first dummy electrode 14 by the plurality of connecting portions 31 through the plurality of opening portions H formed in the insulating layer 1. Therefore, the peripheral region R2 on the insulating layer 1 does not need to be ensured on the outside of the touch region R1 in the X direction, and it is possible to narrow a peripheral region R2 which is not used for touch detection.

In addition, in general, there are many cases in which terminals of the plurality of first wiring lines 12 and terminals of the plurality of second wiring lines 22 are aggregated at one end of the insulating layer 1 so that a touch panel drive device is easily connected to the touch panel. In this case, typically, the plurality of first wiring lines 12 or the plurality of second wiring lines 22 need to be disposed along the periphery of the touch region R1. Therefore, the plurality of first wiring lines 12 or the plurality of second wiring lines 22 has a long length, and as a result, electric resistance also increases, and thus the detection sensitivity for a touch operation may decrease.

In the touch panel according to the embodiment 1, the second detection electrode 21 is connected to the second wiring line 22 disposed in the first dummy electrode 14 by the plurality of connecting portions 31 through the plurality of opening portions H formed in the insulating layer 1. Therefore, the plurality of first wiring lines 12 and the plurality of second wiring lines 22 can be led out toward the same direction, and the plurality of first wiring lines 12 and the plurality of second wiring lines 22 can be made relatively short to reduce electric resistance, thereby improving the detection sensitivity for a touch operation.

Here, in a case where the thickness of the insulating layer 1 is less than 0.5 µm, in a case where fissuring, disconnection, or the like occurs in the connecting portion 31 due to the deformation of the insulating layer 1, the risk of occurrence of poor conductive connection in the connecting portion 31 may increase. In addition, in a case where the thickness of the insulating layer 1 is larger than 5.0 µm, the connecting portion 31 is not normally formed, and thus the risk of occurrence of poor conductive connection in the connecting portion 31 may increase. As a result, the thickness of the insulating layer 1 is preferably 0.5 µm or more and 5.0 µm or less.

In addition, in order to improve the conductive connectivity to the second detection electrode 21 and the second wiring line 22, the connecting portion 31 is preferably composed of a conductive material different from the conductive material that constitutes the second detection electrode 21 and the second wiring line 22. Further, the connecting portion 31 is preferably composed of a transparent conductive material in order to make it difficult for a user to visually recognize the connecting portion 31. In a case where a transparent conductive material is used for the connecting portion 31, the influence on visibility is removed, that is, the connecting portion 31 is made unnoticeable. Therefore, the opening portion H of the insulating layer 1 can be enlarged.

Figure 4:
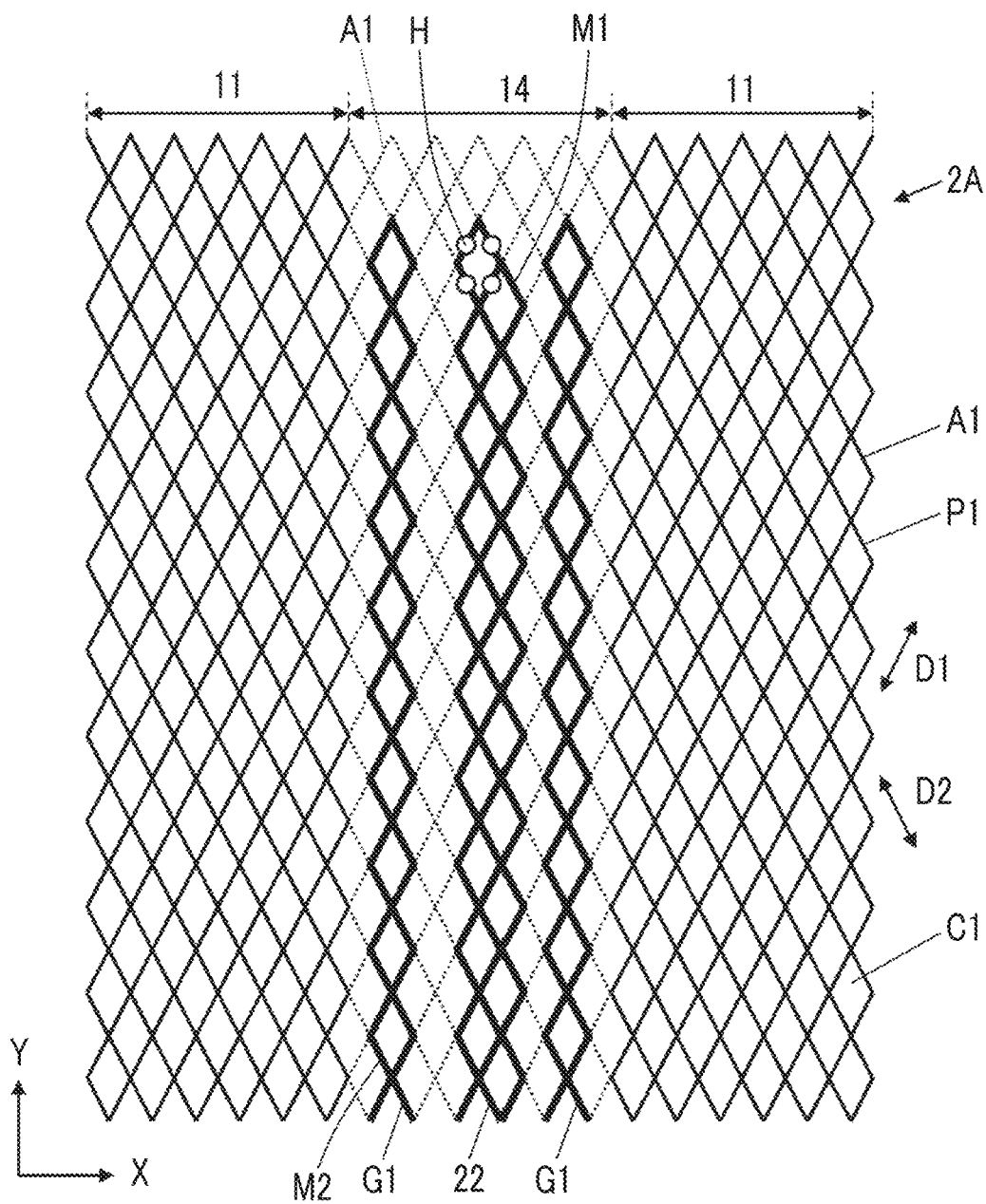
FIG. 4 is an enlarged plan view showing a part of a first conductive layer according to the embodiment 1.

FIG. 4 is a partially enlarged plan view showing the first conductive layer 2A. The plurality of first detection electrodes 11 and the plurality of first dummy electrodes 14 have a first mesh pattern P1 formed from a first fine metal wire A1 in planar view. The first mesh pattern P1 is composed of a plurality of rhombic first basic mesh cells C1 that are formed from four sides that extend along a first extension direction D1 and a second extension direction D2 different from the X direction and the Y direction.

It is noted that the mesh pattern in the present invention does not necessarily have to be a continuous line formed from a fine metal wire and may be a pattern having a discontinuous portion (disconnected portion) in the mesh pattern.

The second wiring line 22 forms a mesh-like second wiring pattern M1 that is composed by connecting a plurality of first basic mesh cells C1, and it constitutes a part of the first mesh pattern P1 in the first dummy electrode 14.

In addition, in the example of FIG. 4, the opening portions H are respectively located on four sides of one first basic mesh cell C1 of the second wiring pattern M1, and one second wiring line 22 and one second detection electrode 21 corresponding to each other are electrically connected to each other by four connecting portions 31 that are respectively formed in the four opening portions H. In this way, in the touch panel according to the embodiment 1, the second wiring line 22 and the second detection electrode 21 corresponding to each other are connected to each other by two or more connecting portions 31. As a result, the electrical connection between the second wiring line 22 and the second detection electrodes 21 can be maintained even in a case where fissuring, disconnection, or the like occurs in any one of the plurality of connecting portions 31 due to some reason.

As the number of the connecting portions 31 connecting the second wiring lines 22 and the second detection electrodes 21 corresponding to each other increases, the reliability of the electrical connection between the second wiring line 22 and the second detection electrode 21 is improved. In order to obtain the reliability of the excellent electrical connection between the second wiring line 22 and the corresponding second detection electrode 21, It is preferable that the second wiring line 22 and the second detection electrode 21 are connected to each other, for example, by three or more connecting portions 31.

In addition, as shown in FIG. 4, the first dummy electrode 14 has a first ground wiring line G1 that is disposed between the first detection electrode 11 and the second wiring line 22 and is insulated from the first detection electrode 11 and the second wiring line 22. The first ground wiring line G1 has a so-called electromagnetic shielding function, which prevents electrical interference between an electrical signal conducted through the second wiring line 22 and an electrical signal in the first detection electrode 11. Therefore, the first ground wiring line G1 prevents erroneous detection of a touch operation caused by electrical interference, and thus the detection sensitivity for a touch operation can be improved.

The first ground wiring line G1 forms a mesh-like ground wiring pattern M2 that is composed of a plurality of the first basic mesh cells C1. As a result, even in a case where disconnection occurs in a part of the first ground wiring line G1, it is possible to carry out electromagnetic shielding between the first detection electrode 11 and the second wiring line 22.

Figure 5:
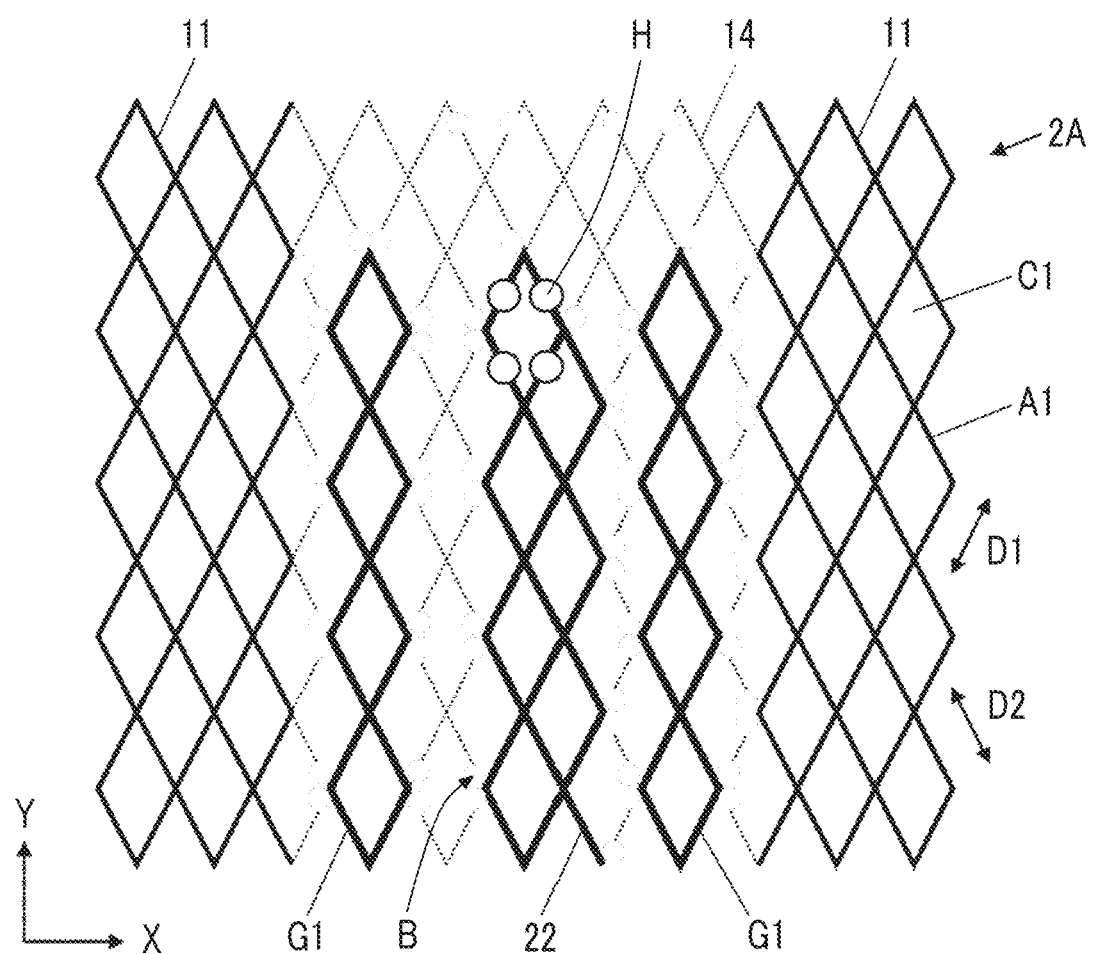
FIG. 5 is an enlarged plan view showing a part of a first dummy electrode according to the embodiment 1.

In addition, as shown in FIG. 5, the first fine metal wire A1 has at least two or more disconnected portions B adjacent to each other between the second wiring line 22 and the first detection electrode 11 adjacent to the second wiring line 22, in a direction in which the first fine metal wire A1 extends, that is, in the first extension direction D1 and the second extension direction D2. As a result, the first detection electrode 11 and the second wiring line 22 can more reliably ensure electrical insulating properties with each other.

In addition, the first fine metal wire A1 has at least two or more disconnected portions B adjacent to each other in the first extension direction D1 and the second extension direction D2 between the first ground wiring line G1 and the first detection electrode 11 adjacent to the first ground wiring line G1 and between the first ground wiring line G1 and the second wiring line 22 adjacent to the first ground wiring line G1, respectively. As a result, the first detection electrode 11 and the first ground wiring line G1 can more reliably ensure electrical insulating properties with each other, and the second wiring line 22 and the first ground wiring line G1 can more reliably ensure electrical insulating properties with each other.

Figure 6:
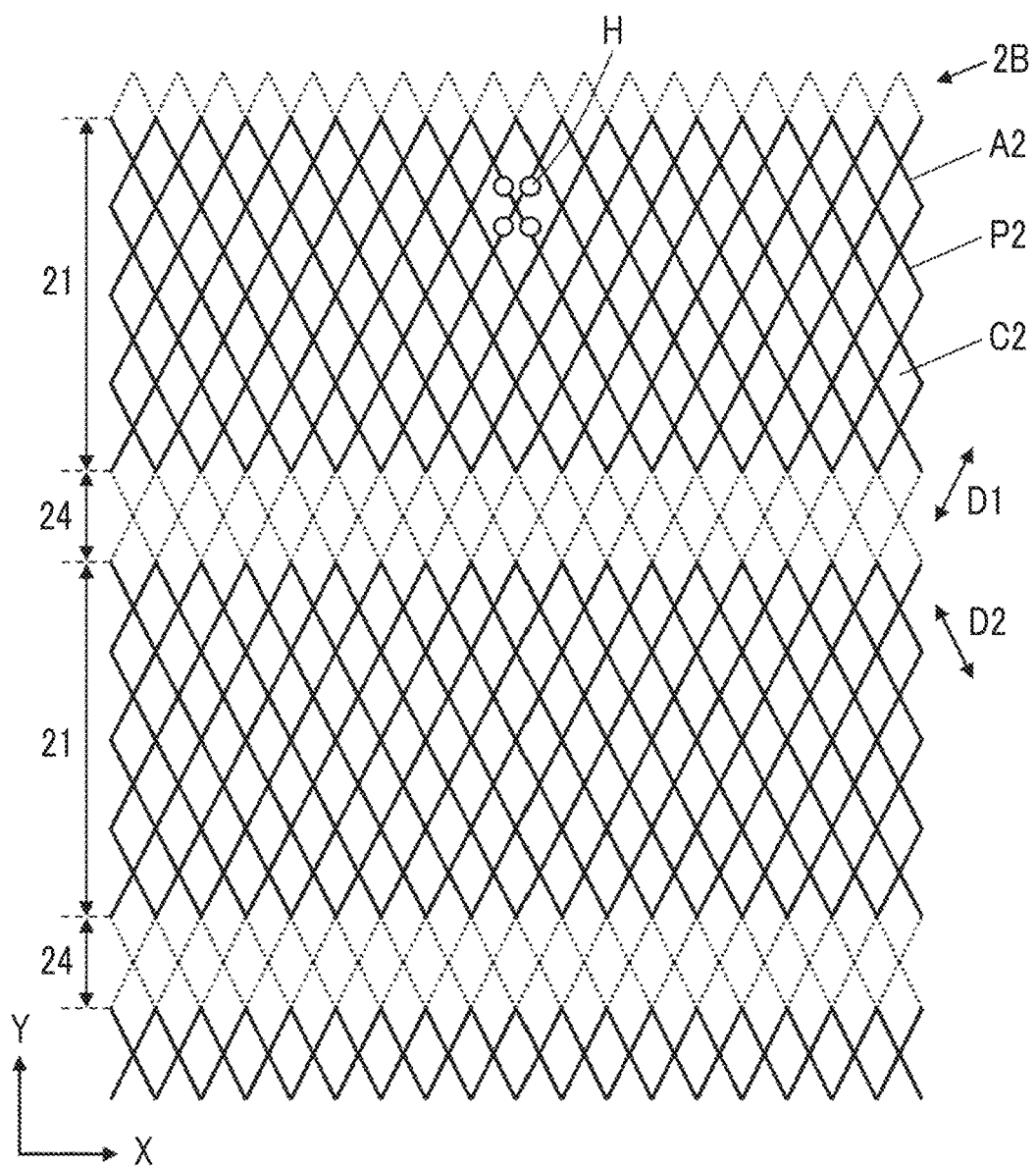
FIG. 6 is an enlarged plan view showing a part of a second conductive layer according to the embodiment 1.

FIG. 6 shows an enlarged plan view of a part of the second conductive layer 2B. The plurality of second detection electrodes 21 and the plurality of second dummy electrodes 24 have a second mesh pattern P2 formed from a second fine metal wire A2 in planar view. The second mesh pattern P2 is composed of a plurality of rhombic second basic mesh cells C2 that are formed from four sides that extend along a first extension direction D1 and a second extension direction D2. Here, the second fine metal wire A2 can be composed of the same conductive material as that of the first fine metal wire A1. In addition, the second basic mesh cell C2 may be the same as or different from the first basic mesh cell C1. However, as will be described later, in order to superimpose the first conductive layer 2A and the second conductive layer 2B to form a third mesh pattern in which mesh cells are regularly arranged, it is preferable that the second basic mesh cell C2 has the same shape and the same size (area) as those of the first basic mesh cell C1.

Figure 7:
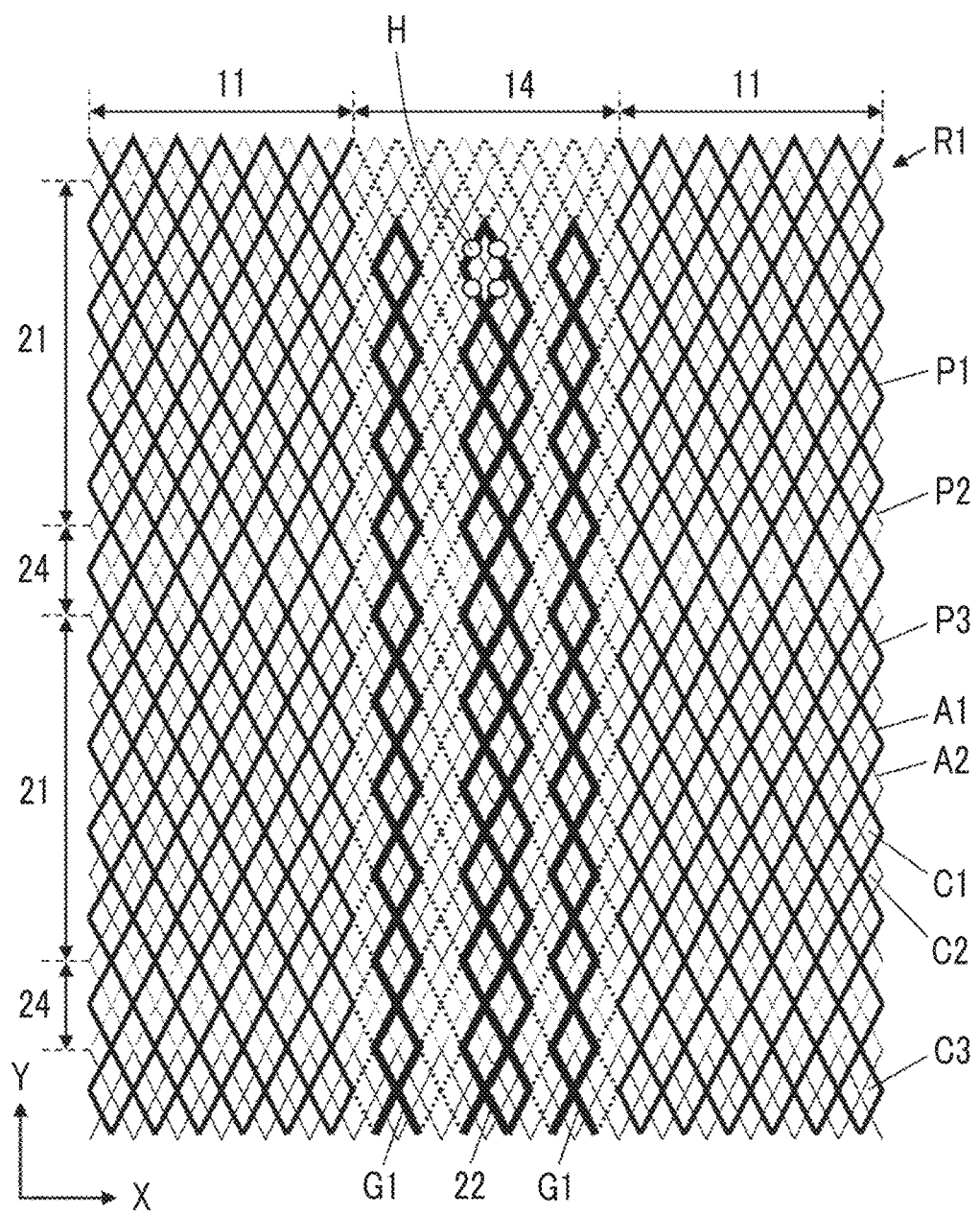
FIG. 7 is an enlarged plan view showing a part of a touch region according to the embodiment 1.

FIG. 7 shows an enlarged plan view of a part of the touch region R1 in the touch panel. In the touch region R1, the plurality of first fine metal wires A1 of the first conductive layer 2A and the plurality of second fine metal wires A2 of the second conductive layer 2B are combined with each other in planar view to constitute a third mesh pattern P3. In the example of FIG. 7, the first basic mesh cell C1 constituting the first mesh pattern P1 and the second basic mesh cell C2 constituting the second mesh pattern P2 have the same shape and the same size, and the first mesh pattern P1 and the second mesh pattern P2 are disposed to be shifted from each other in the X direction, by only half of the width of the first basic mesh cell C1 and the second basic mesh cell C2 (half of the pitch of the first basic mesh cell C1 and the second basic mesh cell C2). Therefore, the third mesh pattern P3 is composed of a plurality of third basic mesh cells C3 having the same shape as the shape of the first basic mesh cell C1 and the second basic mesh cell C2 and having a size (area) of ¼ of the size of the first basic mesh cell C1 and the second basic mesh cell C2.

Since the plurality of second wiring lines 22 disposed in the first dummy electrode 14 constitutes a part of the third mesh pattern P3 in planar view, the presence of the second wiring line 22 is unnoticeable in a case where a user attempts to visually recognize the touch panel. In addition, since the first ground wiring line G1 disposed in the first dummy electrode 14 also constitutes a part of the third mesh pattern P3, the presence of the first ground wiring line G1 is unnoticeable in a case where a user attempts to visually recognize the touch panel.

In addition, in the example of FIG. 7, the connecting portion 31 in the opening portion H is disposed at the intersection portion between the first mesh pattern P1 and the second mesh pattern P2 in planar view. As a result, the conductive conduction between the second wiring line 22 and the second detection electrode 21 is improved, and the presence of the opening portion H and the connecting portion 31 is unnoticeable.

As described above, according to the touch panel according to the embodiment 1 of the present invention, the insulating layer 1 has the plurality of connecting portions 31 that penetrate the insulating layer 1 and connect the plurality of second detection electrodes 21 and the plurality of second wiring lines 22 to each other, both the plurality of first wiring lines 12 and the plurality of second wiring lines 22 are led out in the same direction. Therefore, the peripheral region R2 in which the plurality of first wiring lines 12 and the plurality of second wiring lines 22 are disposed can be narrowed to achieve the frame narrowing of the touch panel. In addition, since the second wiring line 22 and the second detection electrode 21 corresponding to each other are connected to each other by two or more of the connecting portions 31, the electrical connection between the second wiring line 22 and the second detection electrodes 21 can be maintained, for example, even in a case where fissuring, disconnection, or the like occurs in any one of two or more connecting portions 31 that connect the second wiring line 22 and the second detection electrode 21 corresponding to each other.

Embodiment 2

Although it is shown that the opening portion H and the connecting portion 31 of the insulating layer 1 are disposed at the intersection portion between the first mesh pattern P1 and the second mesh pattern P2 in planar view, where the intersection portion is also the intersection between a side of the first basic mesh cell C1 and a side of the second basic mesh cell C2, the opening portion H and the connecting portion 31 can also be disposed, for example, at the intersection portion between the first mesh pattern P1 and the second mesh pattern P2 in planar view, where the intersection portion is also the intersection of the second mesh pattern P2.

Figure 8:
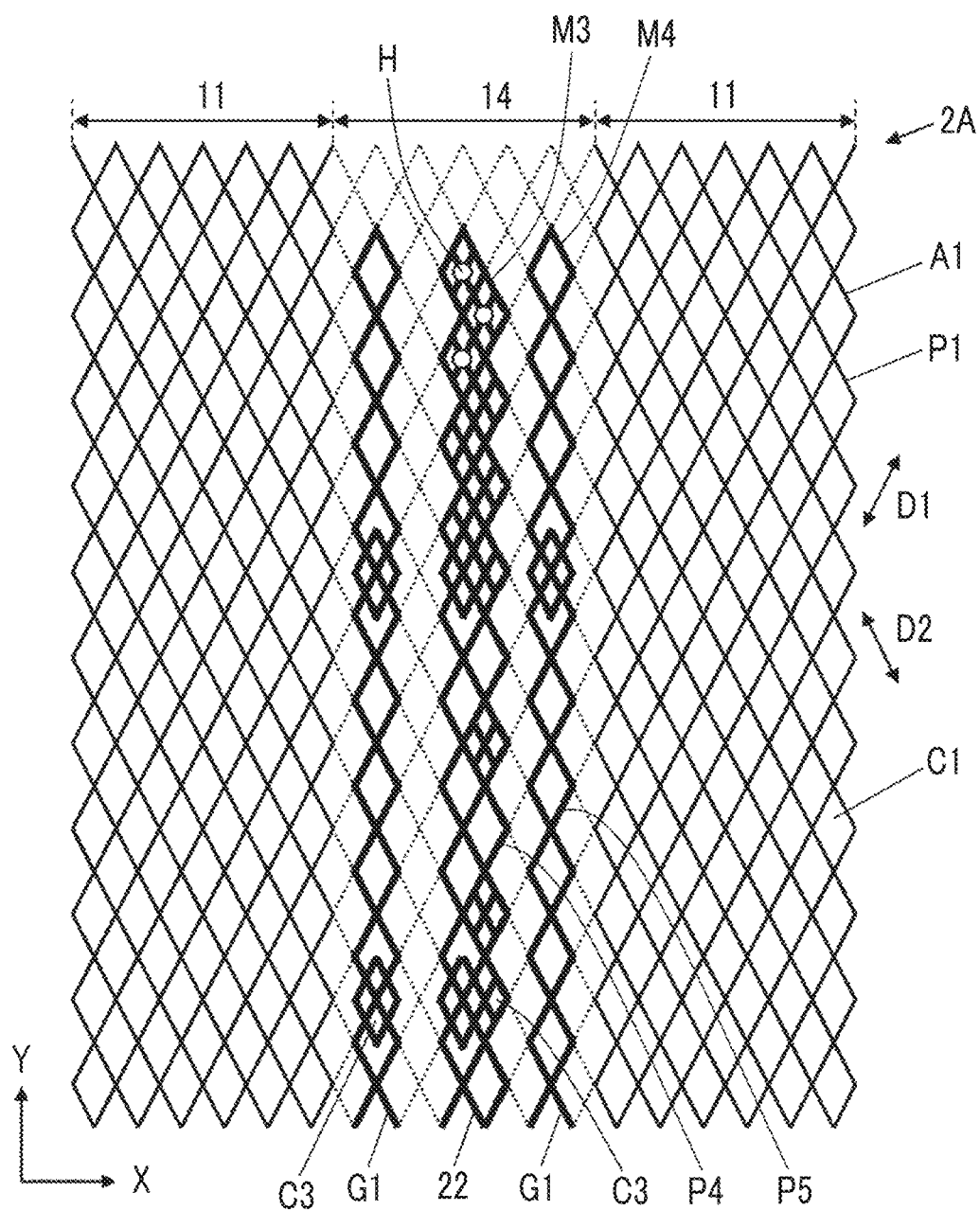
FIG. 8 is an enlarged plan view showing a part of a first conductive layer according to an embodiment 2.

FIG. 8 shows an enlarged plan view of a part of the first conductive layer 2A according to an embodiment 2. The second wiring pattern M3 formed from the second wiring line 22 is formed from a plurality of the first basic mesh cells C1 and a plurality of the third basic mesh cells C3 having the same shape as the shape of the first basic mesh cell C1 and having a size that is ¼ of the size of the first basic mesh cell C1. As a result, the second wiring pattern M3 has a fourth mesh pattern P4 different from the first mesh pattern P1 and the second mesh pattern P2. As will be described later, the fourth mesh pattern P4 is a pattern included in the third mesh pattern P3. By using the fourth mesh pattern P4 including the third basic mesh cell C3 smaller than the first basic mesh cell C1, the resistance of the second wiring line 22 can be reduced, and the sensitivity of the touch panel can be improved.

In addition, a ground wiring pattern M4 formed from the first ground wiring line G1 is formed from a plurality of the first basic mesh cells C1 and a plurality of the third basic mesh cells C3, and it has a fifth mesh pattern P5 different from the first mesh pattern P1, the second mesh pattern P2, and the fourth mesh pattern P4. As will be described later, similar to the fourth mesh pattern P4, the fifth mesh pattern P5 is also a pattern included in the third mesh pattern P3. By using the fifth mesh pattern P5 including the third basic mesh cell C3 smaller than the first basic mesh cell C1, the resistance of the first ground wiring line G1 can be reduced, the above-described electromagnetic wave shielding effect is improved, and the sensitivity of the touch panel can be improved.

Here, since the second wiring pattern M3 is formed from a plurality of the first basic mesh cells C1 and a plurality of the third basic mesh cells C3, the wiring line density of the second wiring line 22 in the second wiring pattern M3 is higher than the wiring line density of the first detection electrode 11. As a result, electrical connection can be maintained between the second detection electrodes 21 and the second electrode pads 23 even in a case where disconnection occurs in the second wiring line 22, and the electric resistance of the second wiring pattern M3 is low, whereby the detection sensitivity for a touch operation is improved. In addition, the wiring line density of the first ground wiring line G1 in the ground wiring pattern M4 is higher than the wiring line density of the first detection electrode 11 as in the case of the second wiring pattern M3. As a result, the resistance of the first ground wiring line G1 can be reduced. Here, the wiring line density refers to a proportion of an area occupied by fine metal wires in a certain region. For example, the wiring line density of the second wiring line 22 indicates a proportion of an area occupied by the first fine metal wires A1 in an area of a region occupied by the second wiring line 22 in planar view, and the wiring line density of the first detection electrode 11 indicates a proportion of an area occupied by the first fine metal wires A1 in an area of a region occupied by the first detection electrode 11 in planar view.

In addition, in the example of FIG. 8, three opening portions H are disposed at positions of apexes of the third basic mesh cells C3 that are located at the centers of the respective three first basic mesh cells C1 that are aligned adjacent to each other in the second wiring pattern M3. As a result, the second wiring line 22 and the second detection electrode 21 corresponding to each other are electrically connected to each other by three connecting portions 31 that are respectively formed in the three opening portions H.

Figure 9:
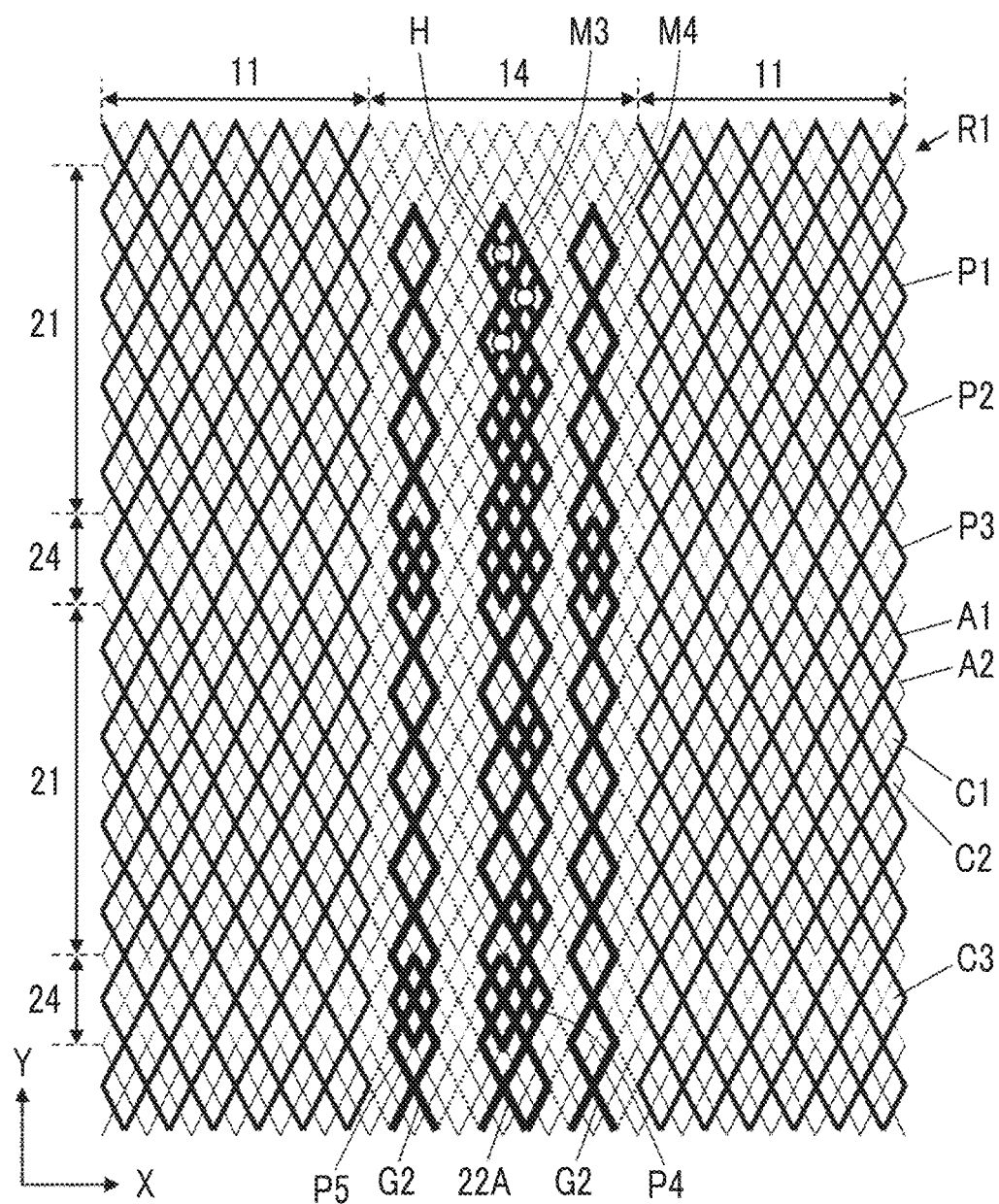
FIG. 9 is an enlarged plan view showing a part of a touch region according to the embodiment 2.

FIG. 9 shows an enlarged plan view of a part of the touch region R1 of the touch panel in which the first conductive layer 2A and the second conductive layer 2B according to the embodiment 2 are combined in planar view. In the touch region R1, the plurality of first fine metal wires A1 of the first conductive layer 2A and the plurality of second fine metal wires A2 of the second conductive layer 2B are combined with each other in planar view to constitute a third mesh pattern P3 formed from a plurality of the third basic mesh cells C3.

Both the fourth mesh pattern P4 formed from the second wiring line 22 and the fifth mesh pattern P5 formed from the first ground wiring line G1 constitute a part of the third mesh pattern P3. As a result, the presence of the second wiring line 22 and the first ground wiring line is unnoticeable in a case where a user attempts to visually recognize the touch panel.

In addition, the three opening portions H and the three connecting portions 31 formed at the three opening portions H are disposed at the intersection portion between the fourth mesh pattern P4 and the second mesh pattern P2 in planar view, where the intersection portion is also the intersection of the second mesh pattern P2. As a result, the presence of the opening portion H and the connecting portion 31 is unnoticeable. In addition, in general, a line width tends to be wide at an intersection of a mesh pattern formed from fine metal wires as compared with other portions of the mesh pattern. Therefore, it is possible to improve the reliability of the electrical connection between the second fine metal wire A2 of the second detection electrode 21 and the connecting portion 31 since the opening portion H can be enlarged by disposing the connecting portion 31 at the intersection of the second mesh pattern P2.

As described above, according to the touch panel according to the embodiment 2, since the second wiring pattern M3 having the fourth mesh pattern P4 is formed from the second wiring line 22, and two or more opening portions H and connecting portions 31 are disposed at the intersection portion between the fourth mesh pattern P4 and the second mesh pattern P2 in planar view, where the intersection portion is also the intersection of the second mesh pattern P2, it is possible to improve the reliability of the electrical connection between the second detection electrode 21 and the connecting portion 31 while achieving the frame narrowing of the touch panel.

It is noted that in the second wiring line 22 and the first ground wiring line G1 of the touch panel according to the embodiment 2 shown in FIG. 8 and FIG. 9, since the third basic mesh cell C3 smaller than the first basic mesh cell C1 is disposed, in planar view, between the second detection electrodes 21 of the second conductive layer 2B, that is, at the position of the second dummy electrodes 24, the parasitic capacitance of the touch panel does not increase by the second wiring line 22 and the first ground wiring line G1, the resistance of the second wiring line 22 and the first ground wiring line G1 can be reduced, and the sensitivity of the touch panel can be further improved.

Hereinafter, each member constituting a touch panel will be described.

Insulating Layer

The insulating layer 1 is not particularly limited as long as it is transparent, has electrical insulating properties, and supports the first conductive layer 2A and the second conductive layer 2B; however, as a material that constitutes the insulating layer 1, for example, glass, toughened glass, non-alkali glass, polyethylene terephthalate (PET), polyethylene naphthalate (PEN), a cycloolefin polymer (COP), a cyclic olefin copolymer (COC), polycarbonate (PC), an acrylic resin, polyethylene (PE), polypropylene (PP), polystyrene (PS), polyvinyl chloride (PVC), polyvinylidene chloride (PVDC), or cellulose triacetate (TAC) can be used. The total light transmittance of the insulating layer is preferably 40% to 100%. The total light transmittance is measured using, for example, "Plastics-Determination of total light transmittance and total light reflectivity" specified in JIS K7375: 2008.

Fine Metal Wire

The first fine metal wire A1 in the first conductive layer 2A and the second fine metal wire A2 in the second conductive layer 2B are a fine metal wire having a line width of 0.5 µm to 10 µm. More preferred line widths of the first fine metal wire A1 and the second fine metal wire A2 are 1.0 µm to 5.0 µm. The preferred materials of the first fine metal wire A1 and the second fine metal wire A2 include silver, copper, aluminum, gold, molybdenum, chromium, and the like, where these can be used as an alloy thereof, an oxide thereof, or a laminate thereof. In particular, from the viewpoint of resistance value, silver or copper is preferable, and it is possible to use a fine metal wire having a laminated configuration, for example, molybdenum/aluminum/molybdenum, molybdenum/copper/molybdenum, or copper oxide/copper/copper oxide.

The film thicknesses of the first fine metal wire A1 and the second fine metal wire A2 are 0.05 µm to 10 µm and preferably 0.1 µm to 1 µm. For the intended purpose of improving the visibility of the first fine metal wire A1 and the second fine metal wire A2, a blackening layer may be provided on the first fine metal wire A1 and the second fine metal wire A2, or between the first fine metal wire A1 and the insulating layer 1 and between the second fine metal wire A2 and the insulating layer 1. As the blackening layer, copper oxide, molybdenum oxide, or the like can be used.

In addition, the following layer can be additionally provided in the touch panel as necessary.

Protective Layer

For the intended purpose of protecting the first fine metal wire A1 and the second fine metal wire A2, a protective layer that covers the first fine metal wire A1 and the second fine metal wire A2 can be provided. As the protective layer, an organic film made of gelatin, an acrylic resin, a urethane resin, or the like, and an inorganic film made of silicon dioxide or the like can be used. The film thickness thereof is preferably 0.01 µm or more and 10 µm or less. In addition, a transparent coating layer can be formed on the protective layer. As the transparent coating layer, an organic film made of an acrylic resin, a urethane resin, or the like is used, and the film thickness thereof is preferably 1 µm or more and 100 µm or less.

Undercoat Layer

In order to reinforce the adhesiveness, an undercoat layer can be provided between the insulating layer 1 and the first conductive layer 2A or between the insulating layer 1 and the second conductive layer 2B. As the undercoat layer, an organic film made of gelatin, an acrylic resin, a urethane resin, a polyester resin, or the like, and an inorganic film made of silicon dioxide or the like can be used. The film thickness thereof is preferably 0.01 µm or more and 10 µm or less.

Planarizing Layer

In order to planarize the surface of the insulating layer 1, a planarizing layer can be provided between the insulating layer 1 and the first conductive layer 2A or between the insulating layer 1 and the second conductive layer 2B. As the planarizing layer, an organic film made of an acrylic resin, a urethane resin, a polyester resin, or the like can be used, and the film thickness thereof is preferably 0.01 µm or more and 10 µm or less. In particular, in a case where a decorative layer is provided on the insulating layer 1, a planarizing layer is preferably provided.

Cover Member

As the cover member described above, a transparent cover member having electrical insulating properties is used. As a material of the cover member, for example, glass, toughened glass, non-alkali glass, polyethylene terephthalate (PET), polyethylene naphthalate (PEN), a cycloolefin polymer (COP), a cyclic olefin copolymer (COC), polycarbonate (PC), an acrylic resin, polyethylene (PE), polypropylene (PP), polystyrene (PS), polyvinyl chloride (PVC), polyvinylidene chloride (PVDC), or cellulose triacetate (TAC) can be used. The cover member can be used as a support (substrate) that supports the first conductive layer 2A and the second conductive layer 2B, and the configuration of the touch panel can be a configuration in which the cover member/the first conductive layer 2A/the insulating layer 1/the second conductive layer 2B are sequentially laminated or a configuration in which the cover member/the second conductive layer 2B/the insulating layer 1/the first conductive layer 2A are sequentially laminated.

Next, a method for forming the first conductive layer 2A and the second conductive layer 2B will be described. As the forming method therefor, for example, a sputtering method, a plating method, or a silver halide method can be appropriately used.

A method of forming the first conductive layer 2A and the second conductive layer 2B using a sputtering method will be described. First, by forming a copper foil layer by sputtering and forming a copper wiring line from the copper foil layer by photolithography, the first conductive layer 2A and the second conductive layer 2B can be formed. It is noted that the copper foil layer can also be formed by so-called vapor deposition instead of sputtering. As the copper foil layer, an electrolytic copper foil can be used in addition to a sputtered copper foil or a vapor deposited copper foil. More specifically, the step of forming a copper wiring line described in JP2014-29614A can be used.

A method for forming the first conductive layer 2A and the second conductive layer 2B using a plating method will be described. For example, the first conductive layer 2A and the second conductive layer 2B can be constituted using a metal plating film that is formed on an electroless plating underlayer by carrying out electroless plating on the underlayer. In this case, the first conductive layer 2A and the second conductive layer 2B are formed by forming a catalyst ink including at least metal fine particles on a substrate in a patterned manner and dipping the substrate in an electroless plating bath to form a metal plating film. More specifically, the method of manufacturing a metal-coated base material described in JP2014-159620A can be used.

In addition, the first conductive layer 2A and the second conductive layer 2B are formed by forming a resin composition having at least a functional group capable of interacting a metal catalyst precursor on a substrate in a patterned manner, adding a catalyst or catalyst precursor, and dipping the substrate in an electroless plating bath to form a metal plating film. More specifically, the method of manufacturing a metal-coated base material described in JP2012-144761A can be applied.

A method of forming the first conductive layer 2A and the second conductive layer 2B using a silver halide method will be described. First, a silver halide emulsion layer including silver halide is subjected to a exposure treatment, in a state where an exposure pattern that is to be the first conductive layer 2A and the second conductive layer 2B is formed and a glass mask where the exposure amount varies locally is disposed, and then subjected to a development treatment, thereby being capable of forming the first conductive layer 2A and the second conductive layer 2B. More specifically, a method of manufacturing the fine metal wire described in JP2012-6377A, JP2014-112512A, JP2014-209332A, JP2015-22397A, JP2016-192200A, or WO2016/157585A can be used.

The present invention is basically constituted as described above. Hereinabove, the touch panel of the embodiment of the present invention has been described in detail. However, the present invention is not limited to the above-described embodiments, and various improvements or modifications can be made within a range not departing from the scope of the present invention.

EXPLANATION OF REFERENCES

1: insulating layer
1A: first surface
1B: second surface
2A: first conductive layer
2B: second conductive layer
11: first detection electrode
12: first wiring line
13: first electrode pad
14: first dummy electrode
21: second detection electrode
22: second wiring line
23: second electrode pad
24: second dummy electrode
31: connecting portion
A1: first fine metal wire
A2: second fine metal wire
B: disconnected portion
C1: first basic mesh cell
C2: second basic mesh cell
C3: third basic mesh cell
D1: first extension direction
D2: second extension direction
G1: first ground wiring line
H: opening portion
M1, M3: second wiring pattern
M2, M4: ground wiring pattern
P1: first mesh pattern
P2: second mesh pattern
P3: third mesh pattern
P4: fourth mesh pattern
P5: fifth mesh pattern
R1: touch region
R2: peripheral region

What is claimed is:

1. A touch panel comprising:

a touch region; and a peripheral region that is present outside the touch region, wherein the touch panel has a configuration in which a first conductive layer consisting of a first fine metal wire, an insulating layer, and a second conductive layer consisting of a second fine metal wire are sequentially laminated, the first conductive layer has a plurality of first detection electrodes that are formed in the touch region, extend along a first direction, and are arranged in a second direction orthogonal to the first direction, a plurality of first dummy electrodes that are disposed between the plurality of first detection electrodes and insulated from the plurality of first detection electrodes, a plurality of first wiring lines that are formed in the peripheral region and connected to the plurality of first detection electrodes, and a plurality of second wiring lines that are disposed on the plurality of first dummy electrodes, the second conductive layer has a plurality of second detection electrodes that are formed in the touch region, extend along the second direction, and are arranged in the first direction, a plurality of connecting portions, which penetrate the insulating layer and connect the plurality of second detection electrodes and the plurality of second wiring lines to each other, are provided, in planar view, the plurality of first detection electrodes and the plurality of first dummy electrodes have a first mesh pattern formed from the first fine metal wire, the first mesh pattern is composed of a plurality of first basic mesh cells which are connected to each other, the plurality of second detection electrodes has a second mesh pattern formed from the second fine metal wire, the second mesh pattern is composed of a plurality of second basic mesh cells which are connected to each other and have a same size of the plurality of first mesh cells, in the touch region, the first mesh pattern and the second mesh pattern are combined with each other in planar view to constitute a third mesh pattern, the third mesh pattern is composed of a plurality of third basic mesh cells which are connected to each other and are smaller than the plurality of first mesh cells and the plurality of second mesh cells, the plurality of second wiring lines correspond to the plurality of second detection electrodes, each of the plurality of second wiring lines is composed of a plurality of unit cells which are connected to each other, the plurality of unit cells include at least one of the first basic mesh cells and at least one of the third basic mesh cells, each of the plurality of connecting portions is formed at any edge of the plurality of unit cells, and one of the plurality of second wiring lines and one of the plurality of second detection electrodes correspond to each other and are connected to each other by two or more of the plurality of connecting portions.

2. The touch panel according to claim 1,
wherein the one of the plurality of second wiring lines and the one of the plurality of second detection electrodes are connected to each other by three or more of the plurality of connecting portions.

3. The touch panel according to claim 1,
wherein each of the plurality of connecting portions is disposed at an intersection of the second mesh pattern.

4. The touch panel according to claim 2,
wherein each of the plurality of connecting portions is disposed at an intersection of the second mesh pattern.

5. The touch panel according to claim 1,
wherein each of the plurality of first dummy electrodes has the first mesh pattern in planar view, and
each of the plurality of connecting portions is disposed at an intersection portion between the first mesh pattern and the second mesh pattern in planar view.

6. The touch panel according to claim 2,
wherein each of the plurality of first dummy electrodes has the first mesh pattern in planar view, and
each of the plurality of connecting portions is disposed at an intersection portion between the first mesh pattern and the second mesh pattern in planar view.

7. The touch panel according to claim 1,
wherein the plurality of connecting portions are composed of a conductive material different from a conductive material that constitutes the plurality of second detection electrodes and the plurality of second wiring lines.

8. The touch panel according to claim 2,
wherein the plurality of connecting portions are composed of a conductive material different from a conductive material that constitutes the plurality of second detection electrodes and the plurality of second wiring lines.

9. The touch panel according to claim 3,
wherein the plurality of connecting portions are composed of a conductive material different from a conductive material that constitutes the plurality of second detection electrodes and the plurality of second wiring lines.

10. The touch panel according to claim 5,
wherein the plurality of connecting portions are composed of a conductive material different from a conductive material that constitutes the plurality of second detection electrodes and the plurality of second wiring lines.

11. The touch panel according to claim 7,
wherein the conductive material of the plurality of connecting portions is a transparent conductive material.

12. The touch panel according to claim 1,
wherein each of the plurality of first dummy electrodes has the first mesh pattern in planar view, and
each of the plurality of second wiring lines constitutes a part of the first mesh pattern in planar view.

13. The touch panel according to claim 2,
wherein each of the plurality of first dummy electrodes has the first mesh pattern in planar view, and
each of the plurality of second wiring lines constitutes a part of the first mesh pattern in planar view.

14. The touch panel according to claim 3,
wherein each of the plurality of first dummy electrodes has the first mesh pattern in planar view, and
each of the plurality of second wiring lines constitutes a part of the first mesh pattern in planar view.

15. The touch panel according to claim 5,
wherein each of the plurality of first dummy electrodes has the first mesh pattern in planar view, and
each of the plurality of second wiring lines constitutes a part of the first mesh pattern in planar view.

16. The touch panel according to claim 1,
wherein each of the plurality of first dummy electrodes has a first ground wiring line that is disposed between one of the plurality of first detection electrodes and the one of the plurality of second wiring lines and is insulated from the one of the plurality of first detection electrodes and the one of the plurality of second wiring lines, and
the first ground wiring line constitutes a part of the first mesh pattern.

17. The touch panel according to claim 2,
wherein each of the plurality of first dummy electrodes has a first ground wiring line that is disposed between one of the plurality of first detection electrodes and the one of the plurality of second wiring lines and is insulated from the one of the plurality of first detection electrodes and the one of the plurality of second wiring lines, and
the first ground wiring line constitutes a part of the first mesh pattern.

18. The touch panel according to claim 1,
wherein the first fine metal wire has at least two or more disconnected portions that are adjacent to each other in a direction in which the first fine metal wire extends, between the one of the plurality of second wiring lines and one of the plurality of first detection electrodes adjacent to the one of the plurality of second wiring lines.

19. The touch panel according to claim 16,
wherein the first fine metal wire has at least two or more disconnected portions, each of which is adjacent in a direction in which the first fine metal wire extends, between the first ground wiring line and the one of the plurality of first detection electrodes adjacent to the first ground wiring line and between the first ground wiring line and the one of the plurality of second wiring lines adjacent to the first ground wiring line.

20. The touch panel according to claim 1,
wherein a thickness of the insulating layer is 0.5 μm or more and 5.0 μm or less.

* * * * *